United States Patent [19]
Bonin et al.

[11] Patent Number: 5,466,741
[45] Date of Patent: Nov. 14, 1995

[54] FLAME-RETARDANT, NONCORROSIVE POLYAMIDE COMPOSITIONS

[75] Inventors: Yves Bonin, Brignais; Jack LeBlanc, St-Genis-Laval, both of France

[73] Assignee: Rhone-Poulenc Chimie, Courbevoie Cedex, France

[21] Appl. No.: 19,438

[22] Filed: Feb. 18, 1993

[30] Foreign Application Priority Data

Feb. 18, 1992 [FR] France ................... 92 02067

[51] Int. Cl.$^6$ ............... C08K 3/38; C08K 3/10
[52] U.S. Cl. ............ 524/405; 524/414; 524/432; 524/80
[58] Field of Search ............ 524/414, 405, 524/432, 80

[56] References Cited

U.S. PATENT DOCUMENTS

| | | | |
|---|---|---|---|
| 4,193,907 | 3/1980 | Tacke et al. | 524/80 |
| 4,921,896 | 5/1990 | Bonin et al. | 524/403 |
| 5,049,599 | 9/1991 | Steiert et al. | 524/80 |
| 5,071,894 | 12/1991 | Weil et al. | 524/127 |
| 5,216,063 | 6/1993 | Williams | 524/414 |

FOREIGN PATENT DOCUMENTS

| | | |
|---|---|---|
| 0092776A3 | 11/1983 | European Pat. Off. |
| 0195301A2 | 9/1986 | European Pat. Off. |
| 0278559A2 | 8/1988 | European Pat. Off. |
| 0312471A2 | 4/1989 | European Pat. Off. |

*Primary Examiner*—Paul R. Michl
*Assistant Examiner*—Lavonda R. DeWitt
*Attorney, Agent, or Firm*—Burns, Doane, Swecker & Mathis

[57] ABSTRACT

Polyamide-based compositions, well suited for molding into a variety of shaped articles useful, e.g., in the electrical and electronics industries, contain an effective flame-retardant amount of red phosphorus and a corrosion/migration-reducing amount of at least one zinc compound selected from among zinc oxide, zinc sulfide and an oxygen-containing zinc salt, e.g., zinc borate.

14 Claims, No Drawings

FLAME-RETARDANT, NONCORROSIVE POLYAMIDE COMPOSITIONS

BACKGROUND OF THE INVENTION

1. Field of the Invention

The present invention relates to novel compositions based on polyamides and rendered flame-retardant by means of red phosphorus, and to the use of such compositions for the production of shaped articles for the electrical and electronic industries.

This invention especially relates to novel polyamide compositions useful for the production of flame-retardant shaped articles which offer a good compromise of properties, in particular with regard to fire and flame resistance, resilience, resistance to arc tracking and surface appearance, as well as low corrosiveness.

2. Description of the Prior Art

It is known to this art that the addition of red phosphorus to compositions based on polyamides imparts a high degree of flame retardancy thereto.

U.S. Pat. No. 3,883,475 describes compositions based on flame-retardant polyamides that purportedly avoid the evolution of highly toxic phosphine, which forms via the disproportionation of red phosphorus under the influence of the trace amounts of water present in the polymer and of the high temperature required for its conversion, these compositions having incorporated therein a metal compound which advantageously is cupric oxide.

Improved such compositions, incorporating cadmium oxide instead of CuO, are described in French Patent No. 2,367,100; in addition to its effectiveness (at least equal to that of CuO) in preventing the evolution of phosphine, cadmium oxide provides shaped articles which have a particularly high resistance to arc tracking (as defined in French Standard NF C 26220), which is equal to or greater than 400 volts in the case of compositions containing no fillers and equal to or greater than 375 volts in the case of compositions filled with more than 25% by weight of glass fibers.

A replacement product for cadmium oxide (which has some toxicity), namely, a compound based on a lanthanide, is described in French Patents Nos. 2,553,783 and 2,621,594. With this adjuvant, the final compositions based on flame-retardant polyamides provide shaped articles which offer a compromise of properties, in particular with regard to flame retardancy, resilience and resistance to arc tracking, which is better than that associated with the incorporation of cadmium oxide.

However, these compositions flame-retarded by means of red phosphorus and optionally comprising other components to prevent the evolution of phosphine exhibit a certain corrosiveness with respect to metal parts which are in contact with the polymer or inserted, for example by molding, into an article shaped from these compositions. This phenomenon is observed, in particular, with molded parts used in the electrical or electronics field to support metal contacts, for example copper contacts.

SUMMARY OF THE INVENTION

Accordingly, a major object of the present invention is the provision of improved flame-retardant polyamide compositions having good mechanical properties, as well as good resistance to electric arc tracking and low corrosiveness to metals.

Briefly, the present invention features compositions which are based on polyamides and include red phosphorus as a flame retardant, and which also comprise a zinc compound additive selected from among zinc oxide, oxygen-containing zinc salts and zinc sulfide. A mixture of at least two of these compounds may also be used.

DETAILED DESCRIPTION OF PREFERRED EMBODIMENTS OF THE INVENTION

More particularly according to the present invention, in a preferred embodiment thereof, the zinc compound content, expressed as weight of zinc with respect to the weight of red phosphorus, ranges from about 10% to about 100%. Preferably, this content ranges from 20% to 80% and more preferably from 40% to 80%.

The subject polyamide compositions may also comprise a filler material such as an inorganic filler.

Exemplary such inorganic fillers include mineral fibers, for example glass or asbestos fibers, glass microbeads, silica, micas, kaolin, bentonites or a mixture of these.

In another preferred embodiment of the invention, the zinc compound is a zinc borate or a mixture of zinc borate and zinc oxide. When it is used in a polyamide composition filled with a reinforcing amount of glass fibers, this compound presents, in particular, the advantage of not substantially adversely affecting the mechanical properties of the composition. Thus, the impact strength of the polyamide compositions filled with glass fibers is not substantially affected by the incorporation of zinc borate.

In another preferred embodiment of the invention, the composition comprises a mixture of zinc borate and zinc oxide in concentrations by weight, expressed as metallic Zn, with respect to phosphorus, ranging from 15% to 60% for zinc oxide and from 15% to 40% for zinc borate. Of course, the total concentration of zinc compounds is within the ranges given above.

The polyamides to be rendered flame-retardant which are suitable for the present invention comprise, in particular, (i) the polyamides prepared by a polycondensation reaction of saturated aliphatic dicarboxylic acids having from 6 to 12 carbon atoms with saturated aliphatic diprimary diamines having from 6 to 12 carbon atoms; (ii) the polyaminoacids prepared either by a direct homopolycondensation reaction of an ω-aminoalkanoic acid containing a hydrocarbon chain having from 4 to 12 carbon atoms or by hydrolytic ring opening and polymerization of the lactams derived from such acids; (iii) the copolyamides prepared from the starting monomers of the aforementioned polyamides, with the proviso that the acid component of said copolyamides may in part comprise terephthalic acid and/or isophthalic acid; and (iv) mixtures of such polyamides.

Exemplary polyamides prepared via a polycondensation reaction of diacids and diamines include nylon 6,6 (polymer of hexamethylenediamine and adipic acid), nylon 6,9 (polymer of hexamethylenediamine and azelaic acid), nylon 6,10 (polymer of hexamethylenediamine and sebacic acid) and nylon 6,12 (polymer of hexamethylenediamine and dodecanedioic acid).

Exemplary polyamino acids include nylon 4 (polymer of 4-aminobutanoic acid or of γ-butyrolactam), nylon 5 (polymer of 5-aminopentanoic acid or of δ-amylolactam) nylon 6 (polymer of ε-caprolactam), nylon 7 (polymer of 7-aminoheptanoic acid), nylon 8 (polymer of capryllactam), nylon 9 (polymer of 9-aminononanoic acid), nylon 10 (polymer of 10-aminodecanoic acid), nylon 11 (polymer of 11-aminoundecanoic acid) and nylon 12 (polymer of 12-aminododecanoic acid or of lauryllactam).

And exemplary copolyamides include nylon 6,6/6,10 (copolymer of hexamethylenediamine, adipic acid and sebacic acid) and nylon 6,6/6 (copolymer of hexamethylenediamine, adipic acid and caprolactam).

The preferred polyamides to be flameproofed according to the present invention are nylon 6,6, nylon 6,10, nylon 6, nylon 6,6/6,10 and nylon 6,6/6.

By the term "red phosphorus" according to the present invention are intended the diverse colored allotropic varieties of phosphorus (red, violet or black phosphorus) marketed under the designation red phosphorus.

The amount of red phosphorus typically ranges from 1% to 30% by weight with respect to the weight of the polyamide to be rendered flame-retardant. Preferably, this amount ranges from 2% to 15% by weight. Even more preferably, such amount ranges from 4% to 10%. In general, it is desirable to incorporate the red phosphorus in finely divided form, for example in the form of particles having an average diameter not exceeding 200 µm and preferably ranging from 1 to 100 µm.

The red phosphorus may be used either as such or in the form of red phosphorus particles coated with a polymer skin. Exemplary of these polymer skins are those prepared from, in particular, epoxy resins (French Patent No. 2,314,221), polymers having maleic, fumaric or allylic unsaturation (French Patent No. 2,314,219), saturated polyesters having a melting point ranging from 50° to 90° C. and a molecular weight of less than 10,000 (French Patent No. 2,373,575), thermoplastic phenol-formaldehyde polycondensation products of the novolac type (French Patent No. 2,344,615) and thermoplastic phenolisobutyraldehyde polycondensation products (European Patent Application No. 82.106329.4, published under the No. 0,071,788); thermoplastic phenol-formaldehyde polycondensation polymers are particularly preferred for this embodiment of the present invention. The amount of polymer used, if necessary, to coat the phosphorus particles may vary over wide limits. Generally, this amount represents 5% to 50% of the total weight of the red phosphorus/coating polymer mixture. It will be appreciated that larger amounts of coating polymer, which can range up to 90% of the total weight of the red phosphorus/coating polymer mixture, may be used without disadvantage.

The zinc compounds are added to the compositions of the invention in diverse forms, such as, for example, in powder form. They may also be in crystalline form or in anhydrous or amorphous form. Advantageously, the zinc compounds must be stable or substantially stable at the temperature at which the compositions are converted and at the normal temperatures of use of said compositions. The characteristics of this powder are not critical. Thus, the shape, the size and the methods for introducing and mixing the zinc compound in the polyamide composition are determined as a function of the usual criteria for the formulation of a thermoplastic polymer composition intended to be converted by any process, for example by molding, extrusion or injection molding. Thus, it is preferred to use a powder or a material having a fine particle size, the effect being generally better when the particle size of the powder is finer.

Suitable processes for the formulation of these compositions are those conveniently employed for the production of polyamide-based compositions.

Thus, the compositions according to the present invention may be formulated by simple mixing of the various constituents in any appropriate manner that permits a homogeneous composition to be prepared. Preferably, mixing of the diverse constituents in powder or granule form is performed by first carrying out premixing under cold conditions in a conventional mixer and then homogenizing the entire mass by hot blending in a single-screw or multiple-screw extruder, the extrusion preferably being carried out under an inert atmosphere such as, for example, nitrogen or argon. At the end of this treatment, rods are obtained which are cooled in water and then cut into granules, it being possible for the latter to then be dried, if appropriate. The compositions according to the invention may also be prepared by formulating a masterbatch, produced in the form of granules based on a portion of the polyamide to be flameproofed, red phosphorus and the zinc compound, which will then be mixed, before use, with granules of the remainder of the polyamide to be rendered flame-retardant.

These compositions have been described above by their essential constituents. It is of course also within the ambit of the invention to modify these compositions as indicated.

By way of examples, when they are intended for the production of shaped articles, the compositions according to the invention may contain diverse additives. They may thus contain, as indicated above, reinforcing or gelling fillers, such as glass or asbestos fibers, glass microbeads, kaolin, silica, micas, bentonites, bentones, or mixtures thereof. Among the aforesaid fillers, glass fibers are most commonly used; such fibers, in general, have an average diameter of from 1 to 15 µm and a length of from 2 to 8 mm. To produce shaped articles having optimum mechanical properties, it is advantageous to use fibers sized, for example, using epoxy resins, polyester resins, polyurethane resins or vinyl resins, these resins generally being combined with coupling agents of the aminosilane type. The proportions of fillers may range, for example, from 10% to 60% by weight with respect to the weight of the polyamide in the composition.

It is also possible to incorporate other additives, such as lubricants, stabilizers, impact modifiers, pigments or dyes, antistatic agents, crystallization agents and agents which stabilize red phosphorus: these additives and the use thereof are widely described in the literature, patent and otherwise.

The compositions according to the invention may be converted into finished or semifinished shaped articles via the customary injection molding or extrusion techniques, for example.

The compositions of the invention exhibit the advantages of polymer compositions containing effective flame-retardant amounts of red phosphorus, namely, a flame and fire resistance and combustibility according to "Underwriters Laboratories" UL 94 vertical test (for test pieces 1.6 mm thick) within the classification range VO to V1. This property is even improved compared with that of compositions devoid of zinc compounds.

However, the presence of the zinc compound improves the resistance to electric arc tracking (such property being designated IRC). This resistance may be greater than 600 volts in the case of the compositions filled with at least 25% by weight of glass fibers.

In addition, the compositions of the invention display a much lower corrosiveness towards metal materials, such as copper, than do compositions that do not contain zinc compounds. These improvements are observed to a high degree when the composition contains a black colorant. The aggressive nature of the subject compositions is illustrated by the following test:

150 g of compound, in the form of granules, containing the composition to be tested are added to a leaktight vessel.

Metal test pieces shaped from copper, brass, silver and bronze are suspended in the vessel above the compound.

The entire assembly is heated at 125° C. for 336 hours.

The degree of corrosion is determined by determining the change (generally the increase) in the weight of the test pieces.

The other properties of the compositions are determined in accordance with the tests below:

Arc propagation resistance (IRC) in volts:
Test designated the "KC technique" described in DIN standard 53480/1972.

Behavior on combustion (UL 94):
Test for determining the vertical combustion in accordance with the standard UL 94 using test pieces 1.6 mm thick, which are assessed:
 (i) after conditioning for 48 hours under 50% relative humidity, and
 (ii) after conditioning for one week at 70° C.

Migration:
Plates of compound 100 mm×100 mm in size and 3.2 mm thick are arranged in a chamber containing a sulfuric acid solution to provide a degree of humidity of 93%. The plates are subjected to 17 24-hour cycles comprising 8 hours at 70° C. and 16 hours at 23° C. Each plate is then washed with 400 ml of water for 4 hours at 40° C. The conductivity of the wash water is determined.

Charpy impact strength:
Determined according to ISO standard 179.

The flame-retardant compositions according to the present invention are particularly suitable for the production of shaped articles which can be used in the electricity industries (for example the electrical and electronics, electric household appliances, radio and automotive industries). The characteristics of these compositions also make it possible to manufacture shaped articles by extrusion and film-forming.

In order to further illustrate the present invention and the advantages thereof, the following specific examples are given, it being understood that same are intended only as illustrative and in nowise limitative.

EXAMPLES

The compositions of the invention were formulated by mixing the constituents thereof in a Werner Pfleiderer type ZSK 40 extruder, the glass fibers being introduced via a Werner ZSB twin feed screw.

The extruder was equipped with a screw rotating at a speed of 250 revolutions per minute at a temperature of 280° C. and with a throughput of 70 kg/h. The degassing pressure was $56 \times 10^2$ Pa.

The starting materials used were:
(a) nylon 6,6 (polymer of hexamethylenediamine and adipic acid): this was a polymer which had a viscosity index of 133 ml/g (determined in accordance with ISO standard R 307, 1977 edition, on the soluble fraction in 90% formic acid);

(b) R 23 Dxl glass fibers marketed by Owens Corning Fiberglass; these were present in a concentration of 25% by weight;

(c) a lubricant: aluminum stearate in a concentration of 0.4% by weight;

(d) a colorant marketed by Williams under the designation Nigrosine Oisol Black N in a concentration of 1.16% by weight;

(e) a flame retardant consisting of red phosphorus marketed under the trademark CPC 400 by Wilbright and Wilson; and (f) a zinc compound selected from among zinc borate, zinc sulfide and zinc oxide. These compounds were either anhydrous or in crystalline form.

The various compositions and their properties are reported in Table 1 below. The concentrations are expressed as percentage by weight of compound with respect to the weight of the final composition. The zinc oxide was an anhydrous oxide and the zinc borate was a hydrate.

TABLE 1

| Example | PA % | Phosphorus % | Zn compounds % | Viscosity | UL 94 | Migration μsiemens | Charpy impact strength kJ/m$^2$ | IRC (V) |
| --- | --- | --- | --- | --- | --- | --- | --- | --- |
| 1* | 62.34 | 4.2 | — | 150 | V1 | 41.1 | 63.2 | 425 |
| 2 | 59.14 | 5.1 | ZnO:1.2 | 159 | V1 | 29.3 | 42.2 | 475 |
| 3 | 59.16 | 4.5 | Zn borate:2.6 | 161 | V0 | 24.3 | 49.3 | 500 |
| 4 | 59.74 | 4.2 | Zn borate:2.6 | 147 | V1 | 18.5 | 51.1 | 550 |
| 5 | 56.80 | 4.0 | ZnO:1.2 Zn borate:2.6 | 153 | V1 | 7 | 43.8 | 575 |
| 6 | 58.54 | 4.2 | ZnO:1.2 Zn borate:2.6 | 139 | V2 | 13 | 40.1 | ≧600 |
| 7 | 61.18 | 4.8 | ZnO:2 Zn borate:3 | 137 | V1 | 5 | 38 | 600 |

*Comparative example

Another series of compositions was produced using as the flame retardant a red phosphorus coated with a phenol-formaldehyde resin. This composition contained 60% by weight of red phosphorus which had an average particle size of 20 to 30 μm and was coated with 40% by weight of the phenol-formaldehyde polycondensation product which had a melting point of 80° C. and a molecular weight of 800. The results obtained are reported in Table 2 below.

TABLE 2

| Example | PA % by weight | Phosphorus % by weight | Zn compounds % by weight | Viscosity | UL 94 | Migration μsiemens | Charpy impact strength kJ/m² | IRC (V) |
|---|---|---|---|---|---|---|---|---|
| 8 | 64.42 | 7.6 | Zns:0.32 | 148 | V1 | 16.5 | 40 | 425 |
| 9 | 63.34 | 7.6 | ZnS:0.5 | 143 | V0 | 16.5 | 38 | 475 |
| 10 | 61.24 | 8.5 | Zn borate:2.6 | 129 | V1 | 6.5 | 38.4 | 350 |

The results of the corrosion test are reported in Table 3 below (increase in the weight of the test pieces in mg):

TABLE 3

| | Test pieces | | | |
|---|---|---|---|---|
| Example | Copper | Brass | Bronze | Silver |
| 1 | 5.3 | 1.3 | 10 | 2.2 |
| 2 | 6.5 | 2 | 12 | 1.1 |
| 3 | 4 | 0.6 | 2.7 | 0.1 |
| 4 | 1.5 | 0.6 | 1.5 | 0.4 |
| 5 | 4.6 | 0.6 | 1.3 | 0.1 |
| 6 | 2.3 | 0.2 | 10.5 | 0.2 |
| 7 | 1.1 | 0.4 | 1.1 | 0.1 |
| 8 | 18.2 | 15.4 | 12 | 2.5 |
| 9 | 14 | 4.3 | 14.7 | 2.2 |
| 10 | 8.3 | 0.8 | 4 | 0.2 |

These results clearly demonstrate the effect of the addition of the zinc compounds on the corrosiveness of the polyamide compositions towards metals, as well as the reduction in migration phenomena.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A composition of matter comprising (a) a polyamide, (b) an effective flame-retardant amount of red phosphorus therefor, and (c) an effective corrosion/migration-reducing amount of zinc borate.

2. The composition of matter as defined by claim 1, further comprising zinc oxide.

3. The composition of matter as defined by claim 1, comprising from 10% to 100% by weight of said (zinc borate (c), based on the weight of said red phosphorus (b).

4. The composition of matter as defined by claim 3, comprising from 20% to 80% by weight of said zinc borate (c), based on the weight of said red phosphorus (b).

5. The composition of matter as defined by claim 4, comprising from 40% to 80% by weight of said zinc borate (c), based on the weight of said red phosphorus (b).

6. The composition of matter as defined by claim 2, comprising from 15% to 40% by weight of said zinc borate and from 15% to 60% by weight of said zinc oxide, based on the weight of said red phosphorus (b).

7. The composition of matter as defined by claim 1, said red phosphorus (b) comprising finely divided particulates thereof.

8. The composition of matter as defined by claim 7, said red phosphorus particulates being coated with a resinous skin.

9. The composition of matter as defined by claim 1, further comprising (d) an inorganic filler material.

10. The composition of matter as defined by claim 9, said inorganic filler material (d) comprising glass fibers.

11. The composition of matter as defined by claim 1, further comprising at least one lubricant.

12. The composition of matter as defined by claim 1, said polyamide (a) comprising nylon 6,6, nylon 6,10, nylon 6, nylon 6,6/6,10 or nylon 6,6/6.

13. A shaped article comprising the composition of matter as defined by claim 1.

14. The composition of matter as defined by claim 1, further comprising zinc sulfide.

* * * * *